US012451302B2

(12) United States Patent
Mannekutla et al.

(10) Patent No.: US 12,451,302 B2
(45) Date of Patent: Oct. 21, 2025

(54) THREE-PHASE ARC QUENCHING DEVICE WITH TWO PISTONS

(71) Applicant: ABB Schweiz AG, Baden (CH)

(72) Inventors: James Mannekutla, Västerås (SE); Elisabeth Lindell, Västerås (SE); Ola Jeppsson, Västerås (SE)

(73) Assignee: ABB Schweiz AG, Baden (CH)

( * ) Notice: Subject to any disclaimer, the term of this patent is extended or adjusted under 35 U.S.C. 154(b) by 422 days.

(21) Appl. No.: 18/065,047

(22) Filed: Dec. 13, 2022

(65) Prior Publication Data

US 2023/0197371 A1 Jun. 22, 2023

(30) Foreign Application Priority Data

Dec. 17, 2021 (EP) .................................... 21215547

(51) Int. Cl.
*H01H 9/26* (2006.01)
*H01H 9/34* (2006.01)

(52) U.S. Cl.
CPC .............. *H01H 9/346* (2013.01); *H01H 9/26* (2013.01); *H01H 2009/267* (2013.01)

(58) Field of Classification Search
CPC ............ H01H 9/30; H01H 9/346; H01H 9/26; H01H 9/0072; H01H 2009/267; H01H 33/04; H01H 33/88; H01H 39/004
USPC ........... 200/50.32, 61.08; 218/75, 92, 93, 95
See application file for complete search history.

(56) References Cited

U.S. PATENT DOCUMENTS

| | | | |
|---|---|---|---|
| 5,933,308 | A | 8/1999 | Garzon |
| 6,633,009 | B1 | 10/2003 | Shea |
| 6,657,150 | B1 | 12/2003 | Shea et al. |
| 6,724,604 | B2 | 4/2004 | Shea |
| 6,839,209 | B2 | 1/2005 | Shea et al. |
| 6,952,332 | B2 | 10/2005 | Slade et al. |

(Continued)

FOREIGN PATENT DOCUMENTS

| | | | |
|---|---|---|---|
| DE | 9419141 | U1 | 5/1996 |
| DE | 19746813 | A1 | 4/1999 |

(Continued)

OTHER PUBLICATIONS

Extended European Search Report; Application No. 21215547.7; Completed: May 20, 2022; Issued: May 31, 2022; 5 Pages.

(Continued)

*Primary Examiner* — William A Bolton
(74) *Attorney, Agent, or Firm* — Whitmyer IP Group LLC

(57) ABSTRACT

An arc quenching device for a three-phase electrical switchgear. The device includes a first busbar, a second busbar and a third busbar, each of a respective phase of the three-phase switchgear. The device also includes a first piston and a second piston, each of an electrically conductive material. The device also includes at least one pyrotechnical actuator arranged with the first and second pistons to axially move each of the first and second pistons if the at least one pyrotechnical actuator is fired. The first and second pistons are arranged in relation to the first, second and third busbars such that said axial movement brings the first piston into contact with both the first busbar and the second busbar, and the second piston into contact with both the first busbar and the third busbar.

20 Claims, 3 Drawing Sheets

(56) References Cited

U.S. PATENT DOCUMENTS

| | | | | |
|---|---|---|---|---|
| 7,123,124 | B2 * | 10/2006 | Caruso | H01H 39/006<br>200/61.08 |
| 7,821,749 | B2 | 10/2010 | Asokan et al. | |
| 8,258,419 | B2 | 9/2012 | Jeong et al. | |
| 8,319,136 | B2 | 11/2012 | Byron et al. | |
| 8,492,672 | B2 | 7/2013 | Shea | |
| 8,618,435 | B2 | 12/2013 | Bohori et al. | |
| 8,653,386 | B2 * | 2/2014 | Ukon | B23D 15/145<br>200/61.08 |
| 8,692,149 | B2 | 4/2014 | Gentsch | |
| 8,861,144 | B2 | 10/2014 | Shea et al. | |
| 9,418,807 | B2 * | 8/2016 | Marlin | H01H 1/365 |
| 10,622,176 | B2 * | 4/2020 | Volkmann | B60L 3/0007 |
| 2015/0108091 | A1 * | 4/2015 | Oberg | H01H 33/905<br>218/66 |
| 2015/0206681 | A1 | 7/2015 | Marlin et al. | |
| 2019/0051478 | A1 * | 2/2019 | Warenits | H01H 39/006 |
| 2021/0233728 | A1 * | 7/2021 | Nakatani | H01H 9/30 |
| 2023/0154708 | A1 * | 5/2023 | Kai | H01H 3/24<br>218/1 |

FOREIGN PATENT DOCUMENTS

| | | | |
|---|---|---|---|
| DE | 19908576 | A1 | 8/2000 |
| DE | 19916327 | A1 | 10/2000 |
| DE | 10254497 | B3 | 6/2004 |
| DE | 102011113955 | A1 | 3/2012 |
| EP | 2073235 | B1 | 1/2013 |
| EP | 2073229 | B1 | 8/2013 |
| EP | 2817859 | B1 | 6/2017 |
| EP | 3696842 | A1 | 8/2020 |
| FR | 2925212 | B1 | 1/2010 |
| GB | 2589714 | A | 6/2021 |
| WO | 9619816 | A1 | 6/1996 |
| WO | 9741582 | A1 | 11/1997 |
| WO | 9921254 | A1 | 4/1999 |

OTHER PUBLICATIONS

Arcteq; AQ 1000, Arc Quenching Device; Retrieved from Internet on May 4, 2023; 2 Pages.

Autoliv; Pyrotechnic Switch Normally Open, PSS-6 switches; Retrieved from Internet on May 4, 2023; 2 Pages.

General Electric; Arc Vault Arc Flash Protection system; https://youtu.be/QQXwGPiUcak; Retrieved from Internet on May 12, 2023; 1 Page.

DEHN; DEHNshort DSRT QD II Arc Fault Quenching Device; Retrieved from Internet, May 25, 2023; 21 Pages.

Eaton; Arcon—"The Lightning Fast Airbag for Your Switchboard"; Retrieved from the Internet, May 4, 2023; 12 Pages.

Gentsch, D. et al.; "New Ultra Fast Earthing Switch (UFES) device based on the vacuum switching principle"; 24th International Symposium on Discharges and Electrical Insulation in Vacuum (ISDEIV); IEEE; Braunschweig, Germany; Aug. 30, 2010; 2 Pages.

* cited by examiner

THREE-PHASE ARC QUENCHING DEVICE WITH TWO PISTONS

TECHNICAL FIELD

The present disclosure relates to an arc quenching device for a three-phase electrical switchgear.

BACKGROUND

In a switchgear, an arc event, even for a relatively short duration, can result in major damages. An arc can be quenched by short circuiting all phases, to each other (and optionally to ground). To protect switchgear components and avoid damages, the duration of the arc should be reduced. A circuit breaker can interrupt fault currents arising from internal arcs. However, the opening time of the circuit breaker may be relatively long, e.g. 30 to 60 ms. For faster arc quenching, e.g. within 2 ms of arc detection, a pyrotechnical actuator may be used.

EP 3 696 842 discloses a single-phase electrical closing switch for grounding one phase using a pyrotechnical actuator to drive a movable piston to electrically connect both a phase electrode and a ground electrode.

SUMMARY

It is an objective of the present invention to provide an arc quenching device for a three-phase electrical switchgear using at least one pyrotechnical actuator.

According to an aspect of the present invention, there is provided an arc quenching device for a three-phase electrical switchgear. The device comprises a first busbar, a second busbar and a third busbar, each of a respective phase of the three-phase switchgear. The device also comprises a first piston and a second piston, each of an electrically conductive material. The device also comprises at least one pyrotechnical actuator arranged with the first and second pistons to axially move each of the first and second pistons if the at least one pyrotechnical actuator is fired. The first and second pistons are arranged in relation to the first, second and third busbars such that said axial movement brings the first piston into contact with both the first busbar and the second busbar, short-circuiting the first and second busbars via the first piston, and the second piston into contact with both the first busbar and the third busbar, short-circuiting the first and third busbars via the second piston.

According to another aspect of the present invention, there is provided a three-phase electrical switchgear comprising the device of any preceding claim and a fault clearing breaker arranged to break a current of each of the three phases to which the first, second and third busbars, respectively, are connected By allowing both the first and second pistons to electrically contact the first busbar after the at least one pyrotechnical actuator is/are fired, all three phases can be short-circuited using only two pistons, reducing cost and complexity of the arc quenching device.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
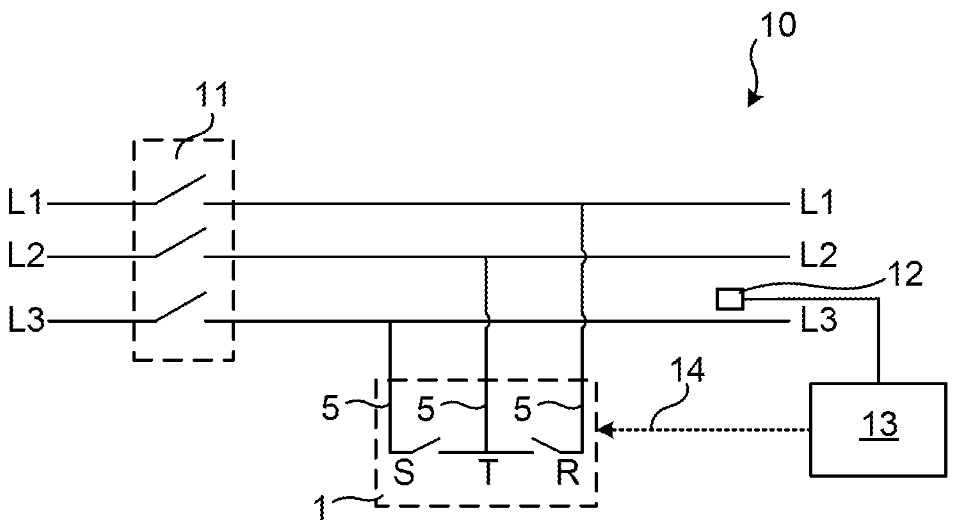
FIG. 1 is a schematic circuit diagram of a three-phase switchgear comprising an arc quenching device, in accordance with some embodiments of the present invention.

FIG. 1 illustrates a three-phase electrical switchgear 10 comprising a breaker 11, e.g. a fault clearing breaker, arranged to break the current of each of the three phases/phase lines L1, L2 and L3. The switchgear 10 may e.g., be arranged to break the current to a load, in which case the switchgear may be arranged between a power distribution system, at a line side of the switchgear, and at least one load, at a load side of the switchgear. The switchgear may be arranged for low or medium voltage applications, implying that the Alternating Current (AC) phase-to-phase voltage of the phases L1, L2 and L3 is within the medium or low voltage range, e.g. within the range of 0.1-50 kV, or within the low voltage range of 0.1-1 kV.

The breaker 11 may typically be able to clear an arc fault, i.e. to break the current in the phases L1, L2 and L3, within a time range of 30-60 ms after detection of the arc fault. This may be too slow to avoid damages resulting from the arc fault. For faster quenching of an arc, the arc quenching device 1 is arranged in the switchgear 10 and able to short-circuit all the phases L1, L2 and L3 much faster, e.g. within a time range of 0.1-5 ms, preferably 0.1-2 ms, after detection of an arc. The arc quenching device 1 is connected to each of the phases L1, L2 and L3 of the switchgear via electrical conductors. Specifically, the device 1 comprises phase busbars 5 (herein also called busbars) electrically connected to the phase lines of the switchgear 10. In the examples presented herein, the three busbars 5, which are each connected to phase L1, L2 or L3, respectively denoted first busbar T, second busbar S and third busbar R. The arc quenching device 1 is configured to quench an arc by short-circuiting all the three busbars T, S and R, to each other (and optionally also to ground), thus short-circuiting the three phases L1, L2 and L3 to each other.

To detect an arc fault, the switchgear 10 comprises an arc fault detector 13 connected to an arc fault sensor 12, e.g. an optical, current, pressure and/or heat sensor configured to detect an electrical arc in the switchgear, e.g. between two of the phases L1, L2 and L3, between a phase and ground, or generally within the switchgear 10. When the arc fault detector 13 detects an arc via the sensor 12, the detector 13 sends a firing signal 14 to the arc quenching device 1, causing the at least one pyrotechnical actuator 3 (see FIG. 2) of the device 1 to fire.

Figure 2A:
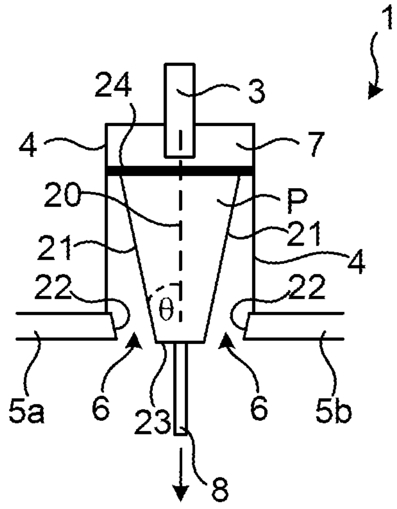
FIG. 2*a* is a schematic view in longitudinal section of a part of an arc quenching device when open (including one of the two pistons in an open position), in accordance with some embodiments of the present invention.
Figure 2B:
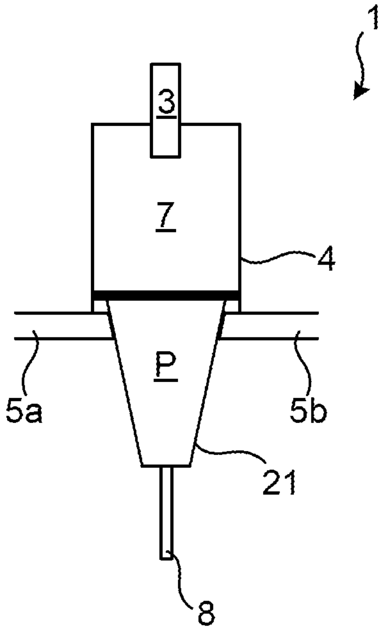
FIG. 2*b* is a schematic view in longitudinal section of the part of an arc quenching device of FIG. 2*a* when closed (the piston is in a closed position), in accordance with some embodiments of the present invention.

FIGS. 2*a* and 2*b* illustrate open and closed positions, respectively, of one of the pistons P of the arc quenching device 1. The piston has a back end 24 facing away from the direction of the axial movement as indicated by the down-pointing arrow in FIG. 2*a*, a front end 23 facing in the direction of said axial movement, and a lateral surface 21. What is discussed about the piston P shown in FIGS. 2*a* and 2*b* is also valid for the other piston P of the device 1.

The piston P, especially its lateral surface 21, is of an electrically conductive material, enabling the piston to short-circuit the busbars 5 via the piston by the lateral surface 21 of the piston making electrical contact with the busbars 5. The piston P may typically have a circular cross-section. The piston is arranged with a pyrotechnical actuator 3 which, when fired, forms an expanding gas which pushes the, previously stationary, piston P along its longitudinal axis 20 in a direction away from the actuator 3 (in the direction indicated by the axial arrow in the figure, below the piston).

The actuator 3 is arranged to axially move the piston P from its open position, e.g. as illustrated in FIG. 2*a*, to its closed position, e.g. as illustrated in FIG. 2*b*, through one opening 6 (as in FIGS. 2*a*, 2*b* and 6), or a plurality of axially arranged openings 6 (as in the examples of FIGS. 3-5 and 7). The opening 6, or each of the openings 6, may be a hole, through hole or blind hole, in a busbar 5, or an opening between two different, and from each other electrically isolated, busbars 5*a* and 5*b* (as in the example of FIGS. 2*a* and 2*b*).

To facilitate causing the axial movement of the piston P by the actuator 3 when firing, a housing 4 may be arranged around the piston P, providing a sealed-off chamber 7 between the back end 24 of the piston P and the inside of the housing 4, preferably during the whole axial movement of the piston. Thus, when the actuator 3 fires, gas may be formed within the chamber 7 which pushes on the back end 24 of the piston P, axially moving the piston and expanding the chamber 7.

Additionally, or alternatively, the actuator may itself comprise a moving part which, when the pyrotechnical actuator is fired, is axially pressed against the piston P, in physical contact therewith, to cause the axial movement of the piston. In this case, the gas expansion may occur in a chamber within the actuator 3 rather than in a chamber 7 between the actuator 3 and the back end 24 of the piston P.

Preferably, the piston P has a tapered shape, tapering towards the front end 23 of the piston, e.g. at an angle θ to the longitudinal axis 20 within the range of 3-12°, preferably 4-8°, e.g. 5.5-6.5°. This allows the piston P to be wedged in the opening(s) 6, said opening(s) typically having a size and shape corresponding to the tapered shape of the piston, at its closed position at the end of its axial movement, improving the electrical connection between the piston P and the busbars 5. Preferably, the piston has a conical shape, e.g. a truncated or frustoconical shape as in the figures. A conical piston typically has a circular base, forming an end surface of the back end 24 of the piston. Typically, the cone is right circular. In a right circular cone piston P, truncated or not, the angle θ between a generatrix line of the lateral surface 21 and the central longitudinal axis 20 may thus be within the range of 3-12°, preferably 4-8°, e.g. 5.5-6.5°.

Preferably, the inner surfaces of the opening(s) 6 are arranged to fit against the tapered shape of the piston P, for improved electrical connection. If the opening 6 is a hole in a busbar 5, the hole may be tapered with the same angle θ to the longitudinal axis 20 as the piston P to fit against the lateral surface 21 at the end of the axial movement of the piston (corresponding to the closed position of the piston P and a closed state of the device 1). Additionally, or alternatively, the hole 6 has a shape (typically circular) and size (in a plane perpendicular to the longitudinal axis 20) which correspond to a cross-section of the piston such that, when the piston has reached its closed position, the inside surface of the hole contacts the lateral surface 21 of the piston around the whole circumference of the piston.

Similarly, if the opening 6 is between two busbars 5*a* and 5*b*, each of the respective end surfaces 22 of the two busbars 5*a* and 5*b* may slant with the same angle θ to the axis 20 as the piston P to fit against the lateral surface 21 at the end of the axial movement of the piston (corresponding to the closed position of the piston P and a closed state of the device 1). Additionally, or alternatively, each of the respective end surfaces 22 of the two busbars 5*a* and 5*b* may be curved in the plane perpendicular to the longitudinal axis 20 to continuously contact around a section of the circumference of the piston when it has reached its closed position.

To guide the piston P into and/or through the opening 6, or plurality of axially arranged openings 6, the piston may be provided with a guide 8 which is axially extending from the front end 23 of the piston. The guide 8 is of an electrically insulating material. The guide 8 is typically cylindrical, e.g. with a circular cross-section.

Figure 3:
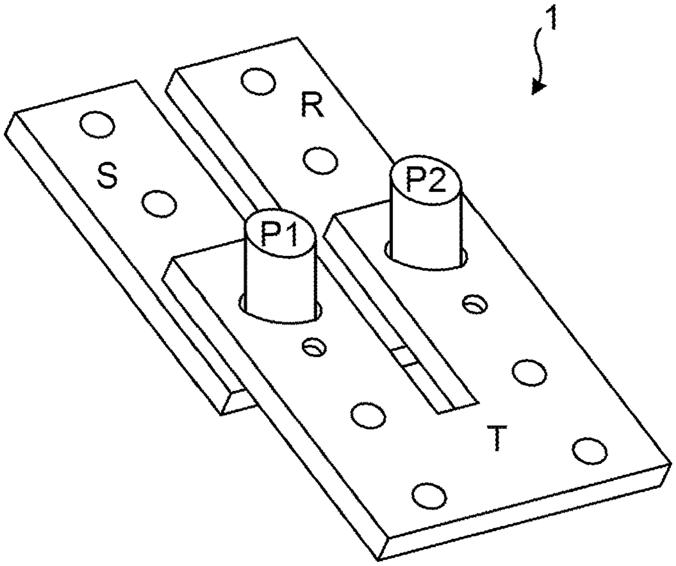
FIG. 3 is a schematic perspective view of the first and second pistons arranged in relation to the first, second and third busbars of an arc quenching device, in accordance with some embodiments of the present invention.
Figure 4:
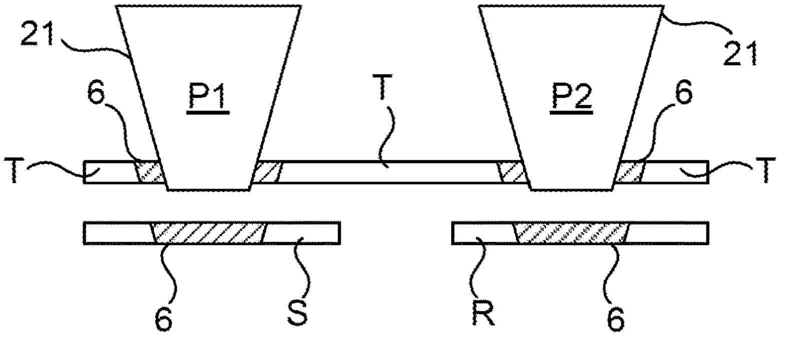
FIG. 4 is a schematic view in longitudinal section of the first and second pistons arranged in open positions in relation to the first, second and third busbars (of a similar embodiment as FIG. 3) of an arc quenching device, in accordance with some embodiments of the present invention.

FIGS. 3 and 4 illustrate an embodiment of the arc quenching device 1 where a first piston P1 and a second piston P2 are each arranged to axially move through a respective opening 6 in the form of a first or second through hole in the first busbar T. Each of the second busbar S and the third busbar R is arranged with an opening 6 in the form of a hole (a through hole or blind hole) in axial alignment with a respective one of the through holes of the first busbar T to receive the first or second piston P1 or P2.

Thus, when the arc quenching device 1 is open, each of the pistons P1 and P2 are in their respective open positions where all of the three busbars T, S and R, are electrically insulated from each other at the opening(s) 6, e.g. by an electrically insulating gas in the opening(s) 6, such as air or by another electrically insulating gas/gas mixture, for instance (pure) nitrogen. In the embodiments of FIGS. 3 and 4, the first busbar T, and thus the first and second holes 6 therein, is in relation to the axial movement of the pistons arranged before (above, in the figures) the holes of the second and third busbars S and R, respectively. Then, the pistons P1 and/or P2 may be in contact with the first busbar T, but not with either of the second busbar S and the third busbar R, or the pistons P1 and/or P2 may not be in contact with any of the busbars T, S or R. However, in other embodiments, the first busbar T, and thus the first and second holes 6 therein, may in relation to the axial movement of the pistons be arranged after (below, in the FIGS. 3 and 4) the holes of the second and third busbars S and R, respectively.

When the at least one pyrotechnical actuator 3 is fired, the first and second pistons P1 and P2 simultaneously move axially until each of them reaches its closed position, closing the arc quenching device 1. In its closed position, the first piston P1 is in physical (and thus electrical) contact with both the first busbar T and the second busbar S. Specifically, the lateral surface 21 of the first piston P1 is in physical contact with the inside surface of the first hole 6 through the first busbar T and with the inside surface of the hole 6 through or in the second busbar S. Similarly, in its closed position, the second piston P2 is in physical (and thus electrical) contact with both the first busbar T and the third busbar R. Specifically, the lateral surface 21 of the second piston P2 is in physical contact with the inside surface of the second hole 6 through the first busbar T and with the inside surface of the hole 6 through or in the third busbar R.

Thus, in some embodiments of the present invention, the device 1 is arranged such that, after the axial movement of the first and second pistons P1 and P2, the lateral surface 21 of the first piston P1 contacts respective inner surfaces of the first hole 6 in the first busbar T and the hole 6 in the second busbar S, and the lateral surface 21 of the second piston P2 contacts respective inner surfaces of a second hole 6 in the first busbar T and a hole 6 in the third busbar R.

As discussed above, the holes 6 of the busbars T, S and R, are preferably shaped to fit against the pistons P1 and P2 when in their closed positions, such that the pistons, by their axial movements, are wedged against the busbars to cause a good electrical contact. For instance, if each of the first and second pistons P1 and P2 has a right circular conical shape, tapering towards its front end 23 (downward in FIG. 4), each of the holes 6 in the first, second and third busbars T, S and R may be circular and have an inner surface with corresponding tapering, i.e. tapering in the direction of the axial movement. Due to the conical shape of the pistons P1 and P2, when the first and second holes 6 of the first busbar T are arranged before the axially arranged holes 6 of the second and third busbars S and R, respectively (as shown in FIG. 4), the first and second holes in the first busbar T preferably each has a larger diameter than the axially arranged later hole of the second or third busbar S or R.

Figure 5:
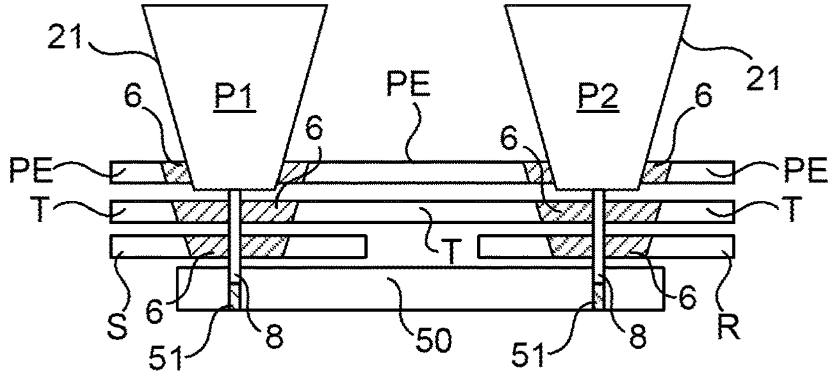
FIG. 5 is a schematic view in longitudinal section of the first and second pistons arranged in open positions in relation to the first, second and third busbars, and also to a protective earth busbar, of an arc quenching device, in accordance with some embodiments of the present invention.

FIG. 5 illustrates an embodiment which is similar to the embodiments of FIGS. 3 and 4, but with also a Protective Earth (PE) busbar. In this embodiment, the PE busbar forms a third layer of busbars, in addition to the two layers of busbars in FIGS. 3 and 4. For instance, as in FIG. 5, the PE busbar may (in the direction of the axial movement) be arranged before (above, in FIG. 5) the first busbar T. In the embodiment of FIG. 5, similar as in the embodiments of FIGS. 3 and 4, the first piston P1 and the second piston P2 are each arranged to axially move through a respective opening 6 in the form of a first or second, respectively, through hole in the PE busbar, which through holes 6 are axially aligned with the first and second through holes 6 of the first busbar T. Each of a second busbar S and a third busbar R are arranged with an opening 6 in the form of a hole (a through hole or blind hole) in axial alignment with a respective one of the through holes of the PE busbar and of the first busbar T to receive the first or second piston P1 or P2.

It follows that, in its closed position, the first piston P1 is in physical (and thus electrical) contact with the PE busbar as well as with both the first busbar T and the second busbar S. Specifically, the lateral surface 21 of the first piston P1 is in physical contact with the inside surface of the first hole 6 through the PE busbar as well as with both the inside surface of the first hole 6 through the first busbar T and the inside surface of the hole 6 through/in the second busbar S. Similarly, in its closed position, the second piston P2 is in physical (and thus electrical) contact with the PE busbar as well as with both the first busbar T and the third busbar R. Specifically, the lateral surface 21 of the second piston P2 is in physical contact with the inside surface of the second hole 6 through the PE busbar as well as with the inside surface of the second hole 6 through the first busbar T and the inside surface of the hole 6 through/in the third busbar R.

Thus, in some embodiments of the present invention, the arc quenching device 1 comprises a protective earth busbar PE arranged such that, when the at least one pyrotechnical actuator 3 is fired, the first and second pistons P1 and P2 are each axially moved until each of the pistons also contacts the protective earth busbar such that each of the first, second and third busbars T, S and R, are also short-circuited to the protective earth busbar PE via at least one of the first and second pistons.

The discussion above relating to the inner surfaces of the holes 6 in the first, second and third busbars T, S and R being shaped to fit against the pistons P1 and P2 when in their respective closed positions is also relevant to the inner surfaces of the holes 6 in the PE busbar.

As mentioned in relation to FIGS. 2*a* and 2*b*, each piston P may be provided with a guide 8 of an electrically insulating material, to aid the piston to pass through the openings 6. This may be especially advantageous in case, as in FIG. 5, each piston is arranged to electrically contact busbars of more than two axially aligned openings 6, e.g. holes through the PE busbar, the first busbar T and the second or third busbar S or R as in the example of FIG. 5. The guide 8 may then ensure that the piston makes physical and electrical contact with all the busbars it is arranged to contact at its closed position at the same time. If a piston P contacts only two busbars, e.g. PE and T in FIG. 5, there is a risk that the piston is delayed or prevented from making contact with all the busbars it is arranged to contact at its closed position, e.g. by welding taking place to the two first contacted busbars.

To ensure controlled straight axial movement of each piston P as it is axially moved by the actuator 3, the guide 8 of the piston may be arranged to pass through a guide hole 51 in an insulator 50 of an electrically insulating material, arranged on the other side of the openings 6 as seen in the direction of the axial movement of the piston. For instance, the front end of the guide 8 may extend into its guide hole 51 of the insulator 50 when the piston is in its open position, and may then then pass further into or through the guide hole during the axial movement until the piston has reached its closed position. Thus, the piston may be prevented from moving at an angle to the longitudinal axis 20, or from tilting, during its axial movement.

Figure 6:
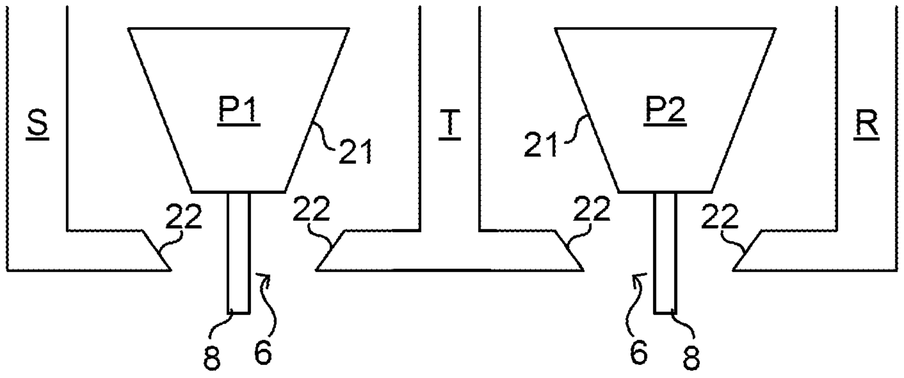
FIG. 6 is a schematic view in longitudinal section of the first and second pistons arranged in open positions in relation to the first, second and third busbars of an arc quenching device, in accordance with some other embodiments of the present invention.

FIG. 6 illustrates another embodiment of the present invention, in which the lateral surfaces 21 of the pistons P1 and P2, instead of being arranged to contact inner surfaces of holes 6 in the first, second and third busbars T, S and R (the inner surface of each hole fully surrounding the piston in the closed position), are arranged to contact end surfaces 22 of each of the first, second and third busbars T, S and R (each end surface 22 only extending along/contacting a section of the circumference of the piston in the closed position).

Thus, in some embodiments of the present invention, the device 1 is arranged such that, after the axial movement of the first and second pistons P1 and P2, the lateral surface 21 of the first piston P1 contacts respective end surfaces 22 of the first busbar T and the second busbar S, and the lateral surface 21 of the second piston P2 contacts respective end surfaces 22 of the first busbar T and the third busbar R. The first, second and third busbars T, S and R, or at least end pars thereof including the end surfaces 22, may be arranged in the same plane perpendicular to the longitudinal axes 20 of the pistons.

As discussed above, in relation to FIGS. 2*a* and 2*b*, the respective end surfaces 22 of the two busbars T and S (for the first piston P1), and T and R (for the second piston P2), may slant with the same angle θ as the piston P1 or P2 tapers to fit against the lateral surface 21 at the closed position of the piston. Additionally, or alternatively, each of the respective end surfaces 22 of the two busbars T and S (for the first piston P1), and T and R (for the second piston), may be curved in the plane perpendicular to the longitudinal axis 20 to continuously contact a section of the circumference of the piston when it has reached its closed position.

Thus, in some embodiments of the present invention, each of the end surfaces 22 of the first, second and third busbars T, S and R, are curved to fit against the lateral surface 21 of the first piston P1 or the second piston P2 with which it is arranged to make contact.

To drive the axial movement of the first and second pistons P1 and P2, at least one pyrotechnical actuator 3 is used. An advantage with a pyrotechnical actuator is the short time it takes to short circuit the three phases, e.g. within 5, 4 or 2 ms from detection of an arc fault.

The at least one pyrotechnical actuator 3 may in some embodiments consist of two actuators 3, one per piston of the first and second pistons P1 and P2. Thus, in some embodiments of the present invention, the at least one pyrotechnical actuator 3 comprises or consists of a first actuator, arranged to move the first piston P1 but not the second piston, and a second actuator, arranged to move the second piston P2 but not the first piston. When more than one actuator 3 is used, it is desirable to fire the actuators at the same time to quickly and simultaneously short circuit all the three phases. Thus, the first and second actuators 3 may be synchronized. It is however noted that the first and second pistons P1 and P2 may move at slightly different times and/or speeds, e.g. within 1-10 μs of each other, since the gas pressure build-up may vary slightly.

Alternatively, in some other embodiments of the present invention, the at least one pyrotechnical actuator 3 consists of only one actuator, arranged to move both the first piston P1 and the second piston P2. For instance, the first and second pistons P1 and P2 may be rigidly mechanically connected to each other such that they do not move in relation to each other during the axial movement by the actuator 3.

Figure 7:
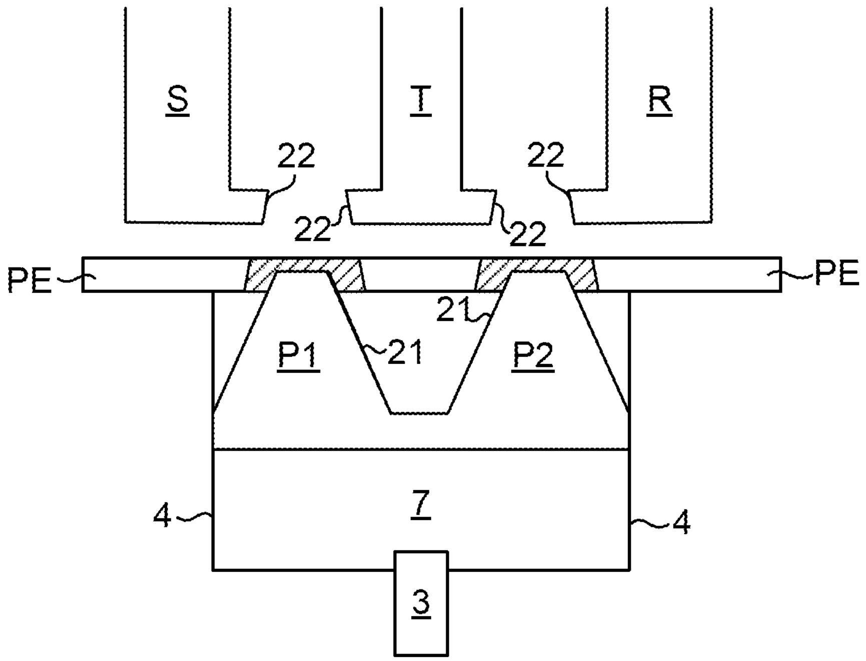
FIG. 7 is a schematic view in longitudinal section of an arc quenching device, showing the first and second pistons arranged in open positions in relation to the first, second and third busbars, and also to a protective earth busbar, in accordance with some other embodiments of the present invention.

FIG. 7 illustrates an example of an embodiment where only one actuator 3 is used for both of the first and second pistons P1 and P2. The first and second pistons P1 and P2 are rigidly mechanically connected to each other and are arranged to axially move together (upwards in the figure) driven by the single actuator 3 to contact the first, second and third busbars T, S and R via end surfaces 22 thereof, optionally through first and second through holes 6 of a PE busbar. The end surfaces 22, as well as the through holes 6, may be as discussed above in relation to other figures.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An arc quenching device for a three-phase electrical switchgear, the device comprising:
- a first busbar, a second busbar and a third busbar, each of a respective phase of the three-phase switchgear;
- a first piston and a second piston, each of an electrically conductive material; and
- at least one pyrotechnical actuator arranged with the first and second pistons to axially move each of the first and second pistons when the at least one pyrotechnical actuator is fired;
- wherein the first and second pistons are arranged in relation to the first, second. and third busbars such that axial movement brings the first piston into contact with both the first busbar and the second busbar, short-circuiting the first and second busbars via the first piston, and the second piston into contact with both the first busbar and the third busbar, short-circuiting the first and third busbars via the second piston.

2. The arc quenching device of claim 1, further comprising a protective earth busbar arranged such that, when the at least one pyrotechnical actuator is fired, the first and second pistons are each axially moved until each piston also contacts the protective earth busbar such that each of the first, second, and third busbars are also short-circuited to the protective earth busbar via at least one of the first and second pistons.

3. The arc quenching device of claim 2, wherein the at least one pyrotechnical actuator comprises:
- a first actuator arranged to move the first piston but not the second piston, and
- a second actuator arranged to move the second piston but not the first piston.

4. The arc quenching device of claim 2, wherein the at least one pyrotechnical actuator comprises only one actuator, arranged to move both the first and the second pistons.

5. The arc quenching device of claim 2, wherein each of the first and second pistons has a tapered shape.

6. The arc quenching device of claim 2, wherein the device is arranged such that, after the axial movement of the first and second pistons, a lateral surface of the first piston contacts respective inner surfaces of a first hole in the first busbar and a hole in the second busbar, and a lateral surface of the second piston contacts respective inner surfaces of a second hole in the first busbar and a hole in the third busbar.

7. The arc quenching device of claim 1, wherein the at least one pyrotechnical actuator comprises:

a first actuator arranged to move the first piston but not the second piston, and a second actuator arranged to move the second piston but not the first piston.

8. The arc quenching device of claim 7, wherein the first and second actuators are synchronized to fire simultaneously.

9. The arc quenching device of claim 1, wherein the at least one pyrotechnical actuator comprises only one actuator, arranged to move both the first and the second pistons.

10. The arc quenching device of claim 9, wherein the first and second pistons are mechanically connected to each other such that the first and second pistons do not move in relation to each other when the first and second pistons are axially moved by the actuator.

11. The arc quenching device of claim 1, wherein each of the first and second pistons has a tapered shape.

12. The arc quenching device of claim 11, wherein the tapered shape is a conical shape.

13. The arc quenching device of claim 12, wherein the conical shape is a frustoconical shape.

14. The arc quenching device of claim 1, wherein the device is arranged such that, after the axial movement of the first and second pistons, a lateral surface of the first piston contacts respective inner surfaces of a first hole in the first busbar and a hole in the second busbar, and a lateral surface of the second piston contacts respective inner surfaces of a second hole in the first busbar and a hole in the third busbar.

15. The arc quenching device of claim 14, wherein each of the first hole in the first busbar the second hole in the first busbar, the hole in the second busbar, and the hole in the third busbar is tapered to fit against the lateral surface of the first piston or the second piston.

16. The arc quenching device of claim 1, wherein the device is arranged such that, after the axial movement of the first and second pistons, a lateral surface of the first piston contacts respective end surfaces of the first busbar and the second busbar, and a lateral surface of the second piston contacts respective end surfaces of the first busbar and the third busbar.

17. The arc quenching device of claim 16, wherein each of the end surfaces of the first, second, and third busbars is curved to fit against the lateral surface of the first piston or the second piston.

18. The arc quenching device of claim 1, wherein each of the first and second pistons is provided with a guide of an electrically insulating material which axially from a front end of the respective piston.

19. A three-phase electrical switchgear comprising:

an arc quenching device having:

a first busbar, a second busbar and a third busbar, each of a respective phase of the three-phase switchgear;

a first piston and a second piston, each of an electrically conductive material; and at least one pyrotechnical actuator arranged with the first and second pistons to axially move each of the first and second pistons when the at least one pyrotechnical actuator is fired;

wherein the first and second pistons are arranged in relation to the first, second, and third busbars such that axial movement brings the first piston into contact with both the first busbar and the second busbar, short-circuiting the first and second busbars via the first piston, and the second piston into contact with both the first busbar and the third busbar, short-circuiting the first and third busbars via the second piston; and a fault clearing breaker arranged to break a current of each of the three phases to which the first, second, and third busbars, respectively, are connected.

20. The three-phase electrical switchgear of claim 19, arranged for low or medium voltage applications.

* * * * *